United States Patent [19]

Vier et al.

[11] Patent Number: 4,699,071
[45] Date of Patent: Oct. 13, 1987

[54] NITROGEN OXIDE REDUCTION IN FURNACES

[75] Inventors: Fritz Vier, Monheim; Michael Schulenburg, Metzkausen; Dietrich Wiese, Hille, all of Fed. Rep. of Germany

[73] Assignee: Henkel Kommanditgesellschaft auf Aktien, Duesseldorf, Fed. Rep. of Germany

[21] Appl. No.: 819,950

[22] Filed: Jan. 16, 1986

[30] Foreign Application Priority Data

Jan. 16, 1985 [DE] Fed. Rep. of Germany ....... 3501189

[51] Int. Cl.$^4$ .......................... F23J 11/00; F23J 15/00
[52] U.S. Cl. .................................... 110/345; 110/204; 110/205; 110/206; 431/115
[58] Field of Search ............... 110/204, 205, 206, 207, 110/303, 345; 431/115; 122/1 A

[56] References Cited

U.S. PATENT DOCUMENTS

| | | | |
|---|---|---|---|
| 3,781,162 | 12/1973 | Rudd et al. | 110/206 X |
| 3,920,377 | 11/1975 | Yanuki et al. | 431/115 |
| 3,927,627 | 12/1975 | Brunn | 431/115 X |
| 4,135,874 | 1/1979 | Tsuzi et al. | 431/115 |
| 4,505,230 | 3/1985 | Caplin | 110/204 X |

Primary Examiner—Edward G. Favors
Attorney, Agent, or Firm—Ernest G. Szoke; Henry E. Millson, Jr.; Mark A. Greenfield

[57] ABSTRACT

A method and apparatus for reducing the NO$_x$ content of hot stack (exhaust) gas produced by a furnace burning a fossil fuel, comprising recycling part of said NO$_x$-containing stack gas, in admixture with cold fresh air, back into the combustion chamber of the furnace.

13 Claims, 1 Drawing Figure

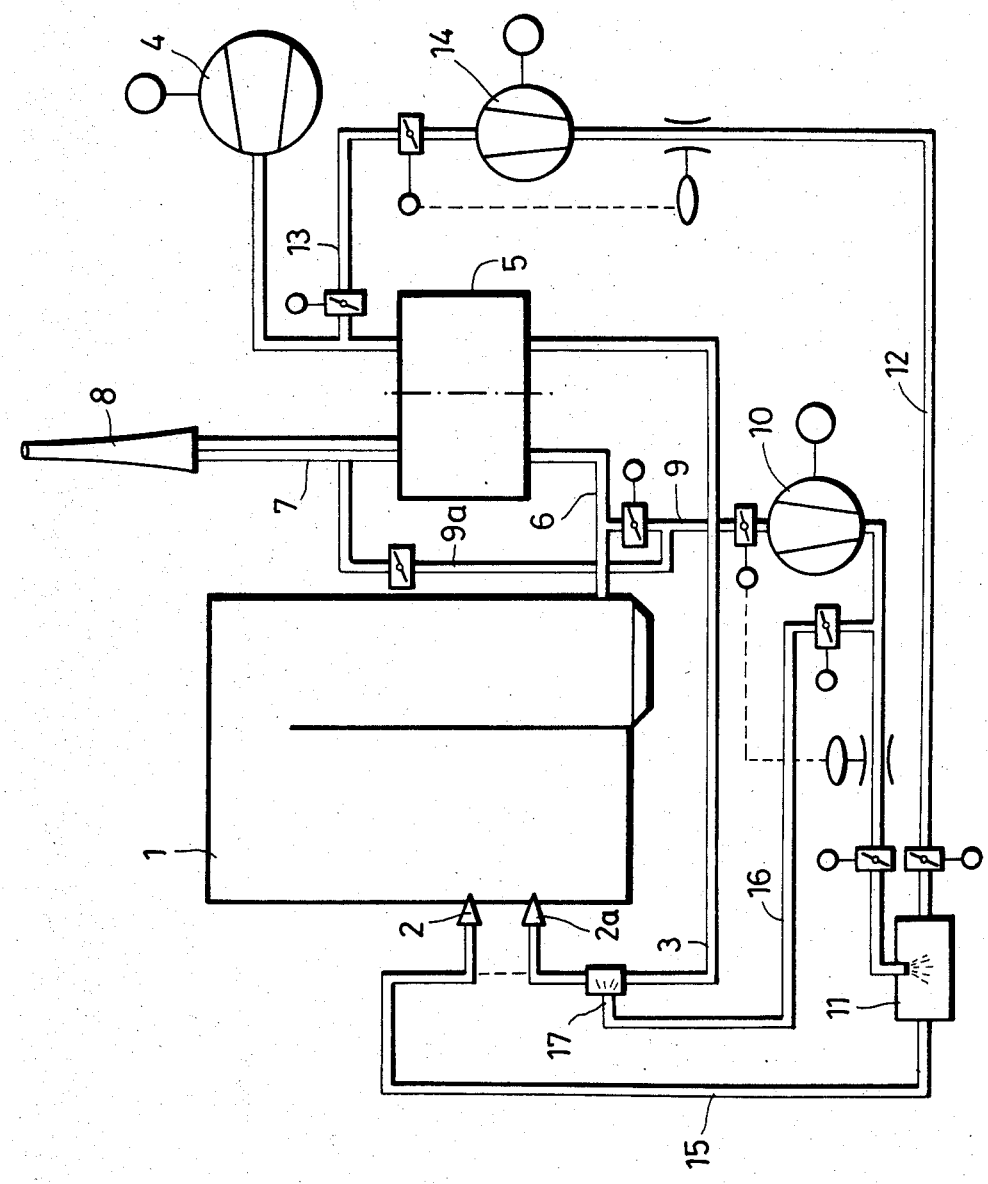

NITROGEN OXIDE REDUCTION IN FURNACES

BACKGROUND OF THE INVENTION

1. Field of the Invention

This invention affords a method and an apparatus for reducing the nitrogen oxide ($NO_x$) content of stack gases produced by the burning of fossil fuels, such as coal, gas, or oil, in furnaces, especially industrial furnaces serving steam boilers.

2. Statement of the Related Art

In furnaces, particularly of the large industrial type, an excess of $NO_x$ in the stack (exhaust) gas is an acute environmental problem. In the Federal Republic of Germany, an ordinance related to such furnaces demands the limitation of $NO_x$ to about 200 mg/Nm$^3$ when coal is the fuel and about 100 mg/Nm$^3$ when gas is the fuel. Similar federal, state, and/or local ordinances exist in other countries. This has resulted in various attempts at compliance.

The reduction of the $NO_x$ content can basically be accomplished by direct modification of the burner or its related apparatus, or by treating the stack gases, for example by catalytic conversion.

It is known that by means of measures related to control of the firing, i.e., with the aid of "low" $NO_x$ burners, $NO_x$ values of about 350 mg/Nm$^3$ can be achieved, wherein up to 30% of the stack gases produced are returned to the combustion chamber. In this known technology the lowering of the $NO_x$ content is at the expense of a considerable reduction in efficiency due to a distinctly elevated energy expenditure. This is especially the case since larger quantities of stack flow through the furnace, so that increased pressure losses occur and thus a considerable increase in electric current consumption for the blower is necessitated. It has also been found that the effect achieved with flame cooling through the return of up to 30% of the stack gas is not always sufficient to produce the desired reduction in $NO_x$, completely independently of the above-described disadvantages and various construction problems.

It is also known to retrofit the heating surface in existing furnaces, causing a change in the temperature profile which is undesireable.

SUMMARY OF THE INVENTION

The present invention achieves a reduction in the $NO_x$ content of furnace stack (exhaust) gas while simultaneously reducing the expenditure of produced energy. This dual achievement is accomplished by the introduction of cold fresh air (preferably ambient) to a recycled stream of stack gas and introduction of that return stream into the furnace at a point where it can itself be combusted by proximity to the point of combustion of the furnace fuel, preferably within the furnace and/or boiler combustion chamber. The addition of this cold fresh air makes it possible to use comparatively low volume flow. Thus, in one embodiment, between 10 and 25%, preferably 10 and 20%, of the volume of stack gases are recycled, together with up to twice that volume of admixed cold fresh air. For example, 40,000 Nm$^3$/hr of cold fresh air may be admixed with 25,000 Nm$^3$/hr of recycled stack gases.

In an additional embodiment to the introduction of cold fresh air, the exhaust (stack) gas from a furnace or boiler is used to preheat some of the cold fresh air by heat exchange, and part of the stack gas is removed from the stream before or after the heat exchanger, or both, and conveyed by at least one blower to at least one mixing nozzle, where it is mixed with the heated fresh air, after which the mixture is fed to the furnace and/or boiler. For example, 25,000 Nm$^3$/hr of recycled stack gas, after being used to preheat some of the cold fresh air is then divided into streams of 10,000 Nm$^3$/hr and 15,000 Nm$^3$/hr, the 10,000 Nm$^3$/hr stream being mixed with a stream of 40,000 Nm$^3$/hr of cold fresh air (a four times the volume ratio—although up to four and a half times is acceptable) and the 15,000 Nm$^3$/hr stream preferably being mixed with five to ten times (preferably about seven and one half times) the volume of the preheated fresh air, both mixtures being separately fed to the furnace. Mixing a partial stream of recycled stack gas with a stream of preheated fresh air is especially useful if it is desired to delay burnout in the flame core. Such an embodiment permits the retrofitting of existing furnaces and/or boilers in order to use the subject invention. The cost of such retrofitting is advantageously low, since generally sufficient space for removing part of the stack gas stream exists between the furnace and/or boiler exhaust gas outlet and the heat exchanger, and/or downstream of the heat exchanger.

In accordance with this invention, the mixture of recycled stack gas and cold fresh air can be returned to the burners and/or the furnace and/or boiler in the area of the burners separately from the preheated fresh air and/or the mixture of a partial stream of recycled stack gas and preheated fresh air. This simplifies retrofitting measures on the burner systems and thus allows retrofitting existing units. In addition, reduced $NO_x$ formation in the area of the burner during the burning of fossil fuels is achieved in this manner.

It is advantageous in this invention if the mixture of recycled stack gas and cold fresh air is introduced to the furnace and/or boiler in the area of the burner via nozzles or an annular gap arranged concentrically around the burner.

BRIEF DESCRIPTION OF THE DRAWING

The drawing of this invention comprises a single figure which is a flow diagram of the method and apparatus according to this invention. Gates and valves are shown in stylized form and are optional unless otherwise indicated.

DETAILED DESCRIPTION OF THE INVENTION

This invention affords both a novel combination of apparatus and a method for reducing $NO_x$ using that apparatus.

As a method of distinguishing (a) recycled stack (exhaust) gases from (b) fresh air or fresh air mixtures, the elements through which the stack gases flow are all identified as "lines" and the elements through which air and stack gas/air mixtures flow are all identified as "conduits." Other than this, the "lines" and "conduits" are not distinguishable.

Element 1 is a furnace, or preferably, a boiler with a plurality of self-contained gas burners, and a combustion chamber. In the drawing, there are shown representative inlets 2 and burners 2a, separated by a dotted line, which indicates that the inlets and burners are connected by conduits or lines leading to them. Exhaust (stack) gases normally containing $NO_x$ leave the boiler 1 via stack gas line 6. The stack gas is then partially directed upward into heat exchanger 5 and/or the stack gas is partially directed downward through the gate into first branch line 9. That stack gas which enters the heat exchanger 5 gives up some of its heat to cold fresh air which also enters the heat exchanger 5, being propelled by fresh air blower 4. The stack gas then leaves heat exchanger 5, passing through discharge gas line 7. At this point, the stack gas may be wholly directed through smoke stack 8 and dissipated in the surrounding air, and/or the stack gas is partially looped through second branch line 9a where it merges with first branch line 9. The stack gas flow through the loop and branch lines 9, 9a, may be controlled by gates, as shown in stylized representation. The cold fresh air entering the heat exchanger 5 is thus preheated, and passes into heated fresh air conduit 3. Some of the cold fresh air from fresh air blower 4 enters fresh air diverter conduit 13, after which it is further propelled by supplemental fresh air blower 14 into supplemental (cold) fresh air conduit 12. The diversion of fresh air may be controlled by one or more gates, shown in stylized form. The first branch line 9, which may carry (1) hot stack gas looped through the heat exchanger 5 and second branch line 9a, or a mixture of (1) and (2), then feeds into stack gas blower 10, which propels the stack gas either into only mixing chamber 11 or into both mixing chamber 11 and branch-off line 16. In the latter instance, the stack gas in branch-off line 16 then enters mixing nozzle 17 where it is mixed with the heated fresh air from heated fresh air conduit 3, and the heated air/stack gas mixture is then fed into burners 2a, where combustible and/or heat-degradable elements of the mixture together with fuel are consumed in boiler 1. As a separate operation, either alternatively or simultaneously, the stack gas propelled by stack gas blower 10 into mixing chamber 11 is mixed with the cold fresh air from supplemental fresh air conduit 12, and the cold air/stack gas mixture passes through mixture conduit 15 into or near burners 2a, where combustible and/or heat-degradable elements of the mixture are consumed in boiler 1. Inlet 2 and burner 2a (each of which represent at least one individual unit) may all be connected to mixture conduit 15, or to mixing nozzle 17, or both, in any desired proportion.

In a preferred embodiment, the cold fresh or air/-stack gas mixture enters the boiler 1 through several tubular nozzles or through an annular gap, arranged concentrically around each burner 2a. This permits the cold fresh air/stack gas mixture to enter the combustion chamber of the boiler separately from any fuel, such as natural gas, which enters through the burners 2a, themselves.

Typically, in a steamboiler with a firing heat capacity of 150 MW and producing 180,000 kg of steam per hour, the fresh air volume drawn in via fresh air blower 4 can amount to 155,000 Nm$^3$/hr and the stack gas volume leaving the boiler 1 over stack gas line 6 can amount to 169,000 Nm$^3$/hr. The partial stack gas stream coming through first branch line 9 and second branch 9a, which is then propelled by stack gas blower 10, can then amount to 25,000 Nm$^3$/hr, while supplemental fresh air blower 14 propels a partial cold fresh air stream which can amount to 40,000 Nm$^3$/hr. After passing through stack gas blower 10, the stack gas stream may be divided into a stream of 10,000 Nm$^3$/hr directed to mixing chamber 11 and a stream of 15,000 Nm$^3$/hr directed to mixing nozzle 17. The mixture of stack gas and cold fresh air coming from mixture conduit 15 then enters the combustion chamber of boiler 1 in the vicinity of inlets 2 at a flow velocity of 80 to 120 m/sec. Similarly, the mixture of stack gas and heated fresh air coming from mixture nozzle 17 then enters the combustion chamber (not specifically shown) of boiler 1 through the burners 2a at a flow velocity of 60 to 80 m/sec. after mixture with the fuel being supplied to the furnace.

Variations of the above typical flow rates will occur when the gates or valves regulating the flow are adjusted, it being possible to vary independently the streams of (1) cold fresh air, (2) stack gas to be mixed with cold fresh air, (3) heated fresh air, (4) stack gas to be mixed with heated fresh air, and (5) stack gas to be discharged through the smoke stack. However, in order to reduce the presence of noxious NO$_x$ gases, at least a minimal amount of cold fresh air mixed with recycled stack gas must be introduced in the area of the burners.

The various apparatus specifically illustrated and described herein should be considered merely as representative and preferred. Thus, the gates or valves may be any other suitable gas flow control means, the blowers may be any other suitable gas propulsion means, the lines and conduits may be any other suitable gas transmission means, the heat exchanger may be any suitable form of heat transfer means, and the mixing nozzle and mixing chamber may be any suitable form of gas-mixing means.

The various methods described herein are all based upon the introduction of cold fresh air into the combustion chamber of a furnace and/or boiler in admixture with any stack gases that contain NO$_x$. The preheating of some of the cold fresh air using the otherwise wasted heat of the stack gas results in a considerable energy saving, but the heated fresh air cannot entirely replace the cold fresh air as used in this invention. However, it is possible to introduce the heated fresh air without mixing it with stack gas, in the same manner as disclosed for that mixture.

We claim:

1. A method for reducing the NO$_x$ content of hot stack gas produced by a furnace burning a fossil fuel, comprising recycling a partial stream of said NO$_x$-containing stack gas by mixing it with a first quantity of cold fresh air and introducing said mixture into said furnace in the vicinity of the combustion of said fossil fuel wherein, in addition, preheated fresh air is introduced into said furnace in the vicinity of the combustion of said fossil fuel.

2. The method of claim 1 wherein between 10 and 25% of the total volume of said stack gas is recycled, mixed with up to twice its volume of cold fresh air.

3. The method of claim 1 wherein said hot stack gas is used to heat a second quantity of cold fresh air to produce said preheated fresh air by heat exchange.

4. The method of claim 1 wherein said recycled partial stream of hot stack gas is used to heat cold fresh air to produce said preheated fresh air by heat exchange.

5. The method of claim 4 wherein 50 to 70% by volume of said recycled partial stream is mixed with said preheated air and said mixture is introduced into said furnace in the vicinity of the combustion of said fossil fuel and the balance of said recycled partial stream is admixed with up to four and one half times its volume of said cold fresh air and said admixture is introduced into said furnace in the vicinity of the combustion of said fossil fuel.

6. The method of claim 5 wherein about 60% by volume of said recycled partial steam is mixed with said preheated air and said balance is admixed with about four times its volume of cold fresh air.

7. The method of claim 5 wherein said mixture is introduced to said furnace through the furnace burners simultaneously with said fossil fuel.

8. The method of claim 5 wherein said admixture is introduced to said furnace through inlets in the vicinity of the furnace burners.

9. An apparatus for reducing the $NO_x$ content of hot stack gas produced by a combustion-chamber containing furnace burning a fossil fuel and exhausted from said furnace through a discharge gas line, comprising:
- a first gas transmission means for diverting a first partial stream of said hot stack gas from said discharge gas line to a gas-mixing means;
- a second gas transmission means connected at its inlet end to a gas propulsion means, for transmitting fresh cold air to said gas-mixing means;
- gas-mixing means comprising a mixing chamber into which said first and said second gas transmission means outlet, adapted to mix said first partial stream of stack gas and said fresh cold air;
- a third gas transmission means connected at its inlet end to said gas-mixing means and at its outlet end to the burner-containing chamber of said furnace;
- a fourth gas transmission means for diverting a second partial stream of said hot stack gas from said discharge gas line to a heat transfer means;
- a fifth gas transmission means connected at its inlet end to a gas propulsion means, for transmitting a second stream of fresh cold air to said heat transfer means;
- a heat transfer means for transferring heat from said second partial stream of hot stack gas to said second stream of cold fresh air to produce heated fresh air;
- a sixth gas transmission means connected at its inlet end to said heat transfer means and adapted to receive said heater fresh air, and connected at its outlet end to the burner-containing combustion chamber of said furnace; and
- a seventh gas transmission means connected at its inlet end to said heat transfer means and joined at its outlet end to said first gas transmission means upstream of said gas-mixing means, so that said first and said second streams of hot stack gas are combined.

10. The apparatus of claim 9 further comprising:
- an eighth gas transmission means branching-off said first gas transmission means, downstream of the point where said first and seventh gas transmission means are joined but upstream of said gas-mixing means, connected at its outlet end to a second gas-mixing means;
- said second gas-mixing means comprising a mixing nozzle midstream of said second gas transmission means so that the heated fresh air in said second gas transmission means is mixed with the second partial stream of said hot stack gas and the mixture is transmitted to said burner-containing combustion chamber.

11. The apparatus of claim 9 wherein said third gas transmission means outlet ends in annular gaps or annular sets of nozzles, concentric with said burners.

12. The apparatus of claim 9 wherein said third and sixth gas transmission means outlets end in annular gaps or annular sets of nozzles, concentric with said burners.

13. The apparatus of claim 9 wherein said third and sixth gas transmission means outlets end in annular gaps or annular sets of nozzles, concentric with said burners.

* * * * *